United States Patent [19]

Burgess

[11] 4,015,497
[45] Apr. 5, 1977

[54] CABLE STRIPPING MACHINES WITH LINKED CUTTING AND DRIVING WHEELS

[75] Inventor: John E. Burgess, South Broughton, England

[73] Assignee: Cleveland Marine Limited, South Broughton, England

[22] Filed: May 12, 1976

[21] Appl. No.: 685,602

[52] U.S. Cl. .............................. 83/425.2; 83/433; 83/924; 81/9.51

[51] Int. Cl.² ........................................ H02G 1/12

[58] Field of Search .............. 81/9.51; 83/924, 444, 83/433, 407, 425.2, 12, 469

[56] References Cited

UNITED STATES PATENTS

| | | | |
|---|---|---|---|
| 3,160,043 | 12/1964 | Judd, Jr. | 83/12 |
| 3,165,951 | 1/1965 | Lindquist | 83/12 |
| 3,631,748 | 1/1972 | Kuts | 81/9.51 |
| 3,817,132 | 6/1974 | Emery | 81/9.51 |

*Primary Examiner*—Al Lawrence Smith
*Assistant Examiner*—Roscoe V. Parker
*Attorney, Agent, or Firm*—Sughrue, Rothwell, Mion, Zinn & Macpeak

[57] ABSTRACT

A machine for stripping automatically the sheath from metal cored cables comprises a pair of driving wheels for feeding the cable to be stripped through a nip between the wheels, one of the driving wheels having a fixed axis and the other driving wheel being movable linearly towards and away from the wheel with the fixed axis and being biassed towards it, and a pair of opposed cutting wheels each having a peripheral cutting edge projecting into the region of the nip substantially midway between the driving wheels so that, as the cable is fed through the nip, the sheath of the cable is slit by the cutting wheels continuously along the length of the cable on opposite sides of the cable to enable the sheath to separate from the core, the cutting wheels being linked to the movable driving wheel in such a way that when the movable driving wheel is displaced towards or away from the fixed driving wheel, the cutting wheels are simultaneously displaced in the same direction but through half the distance moved by the movable driving wheel.

26 Claims, 6 Drawing Figures

CABLE STRIPPING MACHINES WITH LINKED CUTTING AND DRIVING WHEELS

This invention relates to machines for stripping automatically the sheath from metal, particularly copper, cored cables in order to reclaim the core metal.

Such machines are known comprising a pair of driving wheels for feeding the cable to be stripped through a nip between the wheels, and a pair of opposed cutting wheels each having a peripheral cutting edge projecting into the region of the nip substantially midway between the driving wheels so that, as the cable is fed through the nip, the sheath of the cable is slit by the cutting wheels continuously along the length of the cable on opposite sides of the cable to enable the sheath to separate from the core.

In these machines the driving wheels are mounted completely independently of the cutting wheels, and when the machine is to be adjusted to strip a different gauge cable, the relative positions of the cutting wheel and one of the driving wheels have to be adjusted separately by hand in order to maintain the action of the cutting wheels in a plane substantially midway between the driving wheels. These adjustments are time consuming, and, since they are carried out separately by hand, errors in the final position of the driving wheels and cutting wheels may occur. It is these disadvantages that the present invention is intended to overcome.

According to the invention, in a cable stripping machine of the kind described, the axis of one of the driving wheels is fixed and the other driving wheel is movable linearly towards and away from the wheel with the fixed axis and is biassed towards it, and the cutting wheels are linked to the movable driving wheel in such a way that when the movable driving wheel is displaced towards or away from the fixed driving wheel, the cutting wheels are displaced simultaneously in the same direction but through half the distance moved by the movable driving wheel.

With a machine constructed in accordance with the present invention different gauge cables may be presented to the nip between the driving wheels, and the bias acting on the movable driving wheel allows this wheel to adjust automatically to the correct position for feeding the cable through the nip. At the same time, half the movement of the movable driving wheel is transmitted to the cutting wheels, and accordingly the cutting wheels are adjusted automatically to maintain them at a position midway between the two driving wheels.

Preferably the cutting wheels are linked to the movable driving wheel by means comprising an arm which is pivotally connected to one end to the movable driving wheel and is also pivotally mounted at its other end, and means carrying the cutting wheels and pivotally connected to the arm midway between the pivot axes at its opposite ends, the arm being longitudinally displaceable about the pivot axis at one of its ends and the pivot axis at its connection to the means carrying the cutting wheels. Preferably the arm is longitudinally displaceable about the pivot axis at its end remote from the movable driving wheel, the arm having a longitudinally extending slot through which extends a pivot pin which is fixed to a frame of the machine. Similarly, the pivotal connection of the arm to the means carrying the cutting wheels preferably comprises a longitudinally extending slot in the arm through which extends a pivot pin which is fixed to the means carrying the cutting wheels.

Preferably the movable driving wheel is carried by a linearly guided slide plate, and the arm is pivotally connected to the slide plate and thereby to the movable driving wheel. The driving wheels are preferably driven by separate electric motors which are arranged to drive the wheels at the same nominal speed as each other, the motor for driving the movable driving wheel preferably being carried by the slide plate. The use of separate electric motors enables a more reliable drive to be obtained than by using a single electric motor and suitable gearing or chains to drive both wheels from the same motor, since speed variations of the movable driving wheel during its positional adjustment are more readily accommodated than if a common drive is used.

Preferably, each cutting wheel is biassed towards the other and is arranged so that it can retract against the bias in order to accommodate automatically variations in cable size in the plane of the cutting edge without unduly blunting the cutting edge of each cutting wheel on the core of the cable. This arrangement also allows solid steel rods to be fed into the machine, either intentionally to draw the stub of a cable through the driving wheel nip or accidentally, without damaging the cutting wheels. Thus there is much less chance of machine damage occurring due to foreign matter being fed into the machine with the cable than with machines having fixed or hand adjusted cutting and driving wheels. Although it will not usually be necessary, the bias acting on each cutting wheel may be adjusted to suit the material and thickness of the cable sheath to be slit by the cutting wheels.

Preferably the cutting wheels are rotatably mounted on carrier members which are each independently rotatable between fixed angular limits about an axis which lies in or parallel to the plane of the cutting edge of the corresponding cutting wheel and substantially perpendicular to the path of a cable through the nip between the driving wheels. A machine of the kind described and having this arrangement is claimed in our U.S. application Ser. No. 685,580. This arrangement provides each cutting wheel with a limited castor-like action which allows it to swivel in response to lateral forces exerted on it during its rotary cutting motion. The swivel action enables the cutting edges of the cutting wheels to slit the sheath of a cable as the movable driving wheel and cutting wheels are displaced automatically in following variations in cable dimensions, without placing undue lateral stress on either cutting wheel and its bearings. More important however, it relieves the lateral stress which would be placed on the cutting wheels when a cable is fed into, or exits from, the machine, and there is a consequent relatively large displacement of the movable driving wheel.

Preferably, the carrier members are rotatable in a pair of cylinders which are supported on opposite sides of the plane of the driving wheel, in which case the angular limits for the rotary movement of each carrier member may be determined by a slot in the member or the cylinder wall, and a lug which projects into the slot radially from the cylinder or the carrier member respectively.

Preferably, each carrier member is also slidable axially in its cylinder, and when the cutting wheels are biassed towards each other the means biassing each cutting wheel preferably acts on its carrier member within the cylinder. The biassing means may be a spring, or it may comprise a fluid under a controlled pressure. In the latter case, each cylinder may contain a spring which provides a light bias on the carrier member for centering the cutting wheel when the machine is not in operation, but the force with which each cutting wheel, in use, acts on a cable is determined by the pressure of the fluid supplied to the cylinder and can be adjusted to suit the type of sheath to be cut through.

The amount which the cutting wheels are allowed to move towards each other under the action of the biassing means is preferably limited by stop surfaces on each carrier member and its cylinder, and it may be convenient for these stop surfaces to be provided by the lug and the end of the slot nearest the cutting wheel. Preferably, this end of the slot is concave with respect to the slot so that engagement of the lug with the concave surface under the action of the biassing means will tend to center the cutting wheel. In this way, when the machine is not in use the cutting wheels are held in the normal cutting plane midway between the driving wheels ready for the machine to be set in operation.

If desired, the machine may include means for separating from the core of the cable the two halves of the sheath slit by the cutting wheels, for example, a pair of spreaders located behind the cutting wheels for engaging in the slits formed by the cutting wheels to force the cut edges of the sheath apart as the cable is continued to be fed. The spreaders may be fixed to the carrier members of the cutting wheels so that they maintain a constant position relative to the cutting wheels.

An example of a machine in accordance with the present invention is illustrated in the accompanying drawings, in which.

Figure 1:
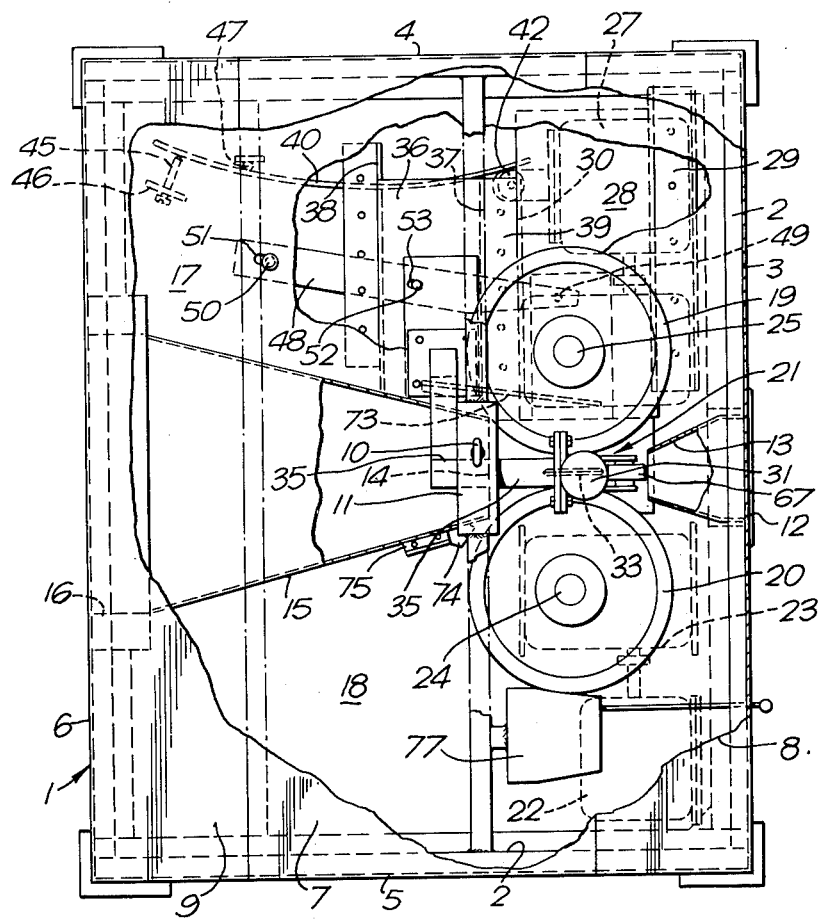
FIG. 1 is a plan view of the machine with parts cut away to illustrate details of the construction.

The machine shown in the drawings has a box-like housing 1 comprising a structural steel frame 2 and front, side, and rear cover plates 3 to 6. The top of the housing 1 has a central flat portion 7 and two sloping portions 8 and 9 respectively leading to the front and rear cover plates 3 and 6. A lifting eye 10 projects from the flat top portion 7, the eye 10 extending through the top 7 and being fixed inside the housing 1 to a bracket 11 which is fixed to the structural frame 2 at the sides of the housing 1. Slightly above its centre, the front cover plate 3 has a rectangular inlet 12 opening into a tapering feed-in chute 13 carried by the frame 2. Aligned with the feed-in chute 13 but axially spaced from it is the narrow receiving end 14 of a rectangular sectioned outlet chute 15 which widens to an outlet opening 16 in the rear cover plate 6 of the housing. The chute 15 is supported at its outlet end 16 by the frame 2, and along its sides by a pair of horizontal support plates 17 and 18 which are each fixed to the frame 2 at the front, the corresponding side, and the rear of the frame 2.

Mounted above the support plates 17 and 18 are a pair of driving wheels 19 and 20 which are arranged to rotate about parallel vertical axes so that their peripheries are located close together to form a nip 21 in the space between the feed-in chute 13 and the receiving end 14 of the outlet chute 15. The driving wheel 20 is driven by an electric motor 22, a gear box 23, and a driving shaft 24 which extends through a gap in the support plate 18. The motor 22 and the gear box 23 are fixed to the frame 2 and the support plate 18, which means that the axis of the drive shaft 24 about which the driving wheel 20 rotates is fixed. The other driving wheel 19 is similarly driven by a driving shaft 25 through a gear box 26 from an electric motor 27 so that the driving wheels 19 and 20 are arranged to be driven at the same nominal speed as each other but in opposite directions. In this case however, the motor 27 and gear box 26 are fixed to the underside of a slide plate 28 which is arranged to slide horizontally beneath the support plate 17 between a pair of parallel supporting guide rails 29 and 30 which are fixed to the support plate 17. The driving shaft 25 of the driving wheel 19 projects through a gap in the support plate 17, and movement of the slide plate 28 longitudinally between the guides 29 and 30 moves the axis of the shaft 25 and hence the driving wheel 19 towards or away from the other driving wheel 20 to vary the gap between the peripheries of the wheels 19 and 20 at the nip 21.

Mounted vertically above and below the nip 21 between the driving wheels 19 and 20 are a pair of cutting wheel assemblies 31 and 32 each having a cutting wheel 33, 34 respectively with its peripheral cutting edge projecting into the region of the nip 21 and located in a common plane which bisects the nip 21 and is substantially perpendicular to the plane containing the driving wheels 19 and 20. The narrowest point between the cutting wheels 33 and 34 is located slightly behind (i,e., nearer the receiving end 14 of the outlet chute 15) the narrowest point of the nip 21. The two cutting wheel assemblies 31 and 32 are attached to a common bracket 35 which in turn is fixed to a second slide plate 36 which is arranged to slide parallel to the driving wheel slide plate 28 between parallel supporting guide rails 37 and 38 which are fixed to the underside of the support plate 17. The guide rails 30 and 37 are located along opposite edges of a single member 39.

The slide plate 28, and hence the driving wheel 19 is biassed towards the other driving wheel 20 by means of a spring steel strip 40 which acts at one end 41 on the slide plate 28 through a ball race 42 carried by a bracket 43 fixed to the slide plate 28. The other end 44 of the spring steel strip 40 is acted on by a thrust member 45 which comprises a screw threaded through a plate 46 fixed to the underside of the support plate 17. Between its ends, the strip 40 extends over a fulcrum member 47 which is fixed to the underside of the support plate 17 so that the strip 40 is flexed to supply the required bias to the slide plate 28. Adjustment of the screw 45 will vary the biassing force.

Figure 2:
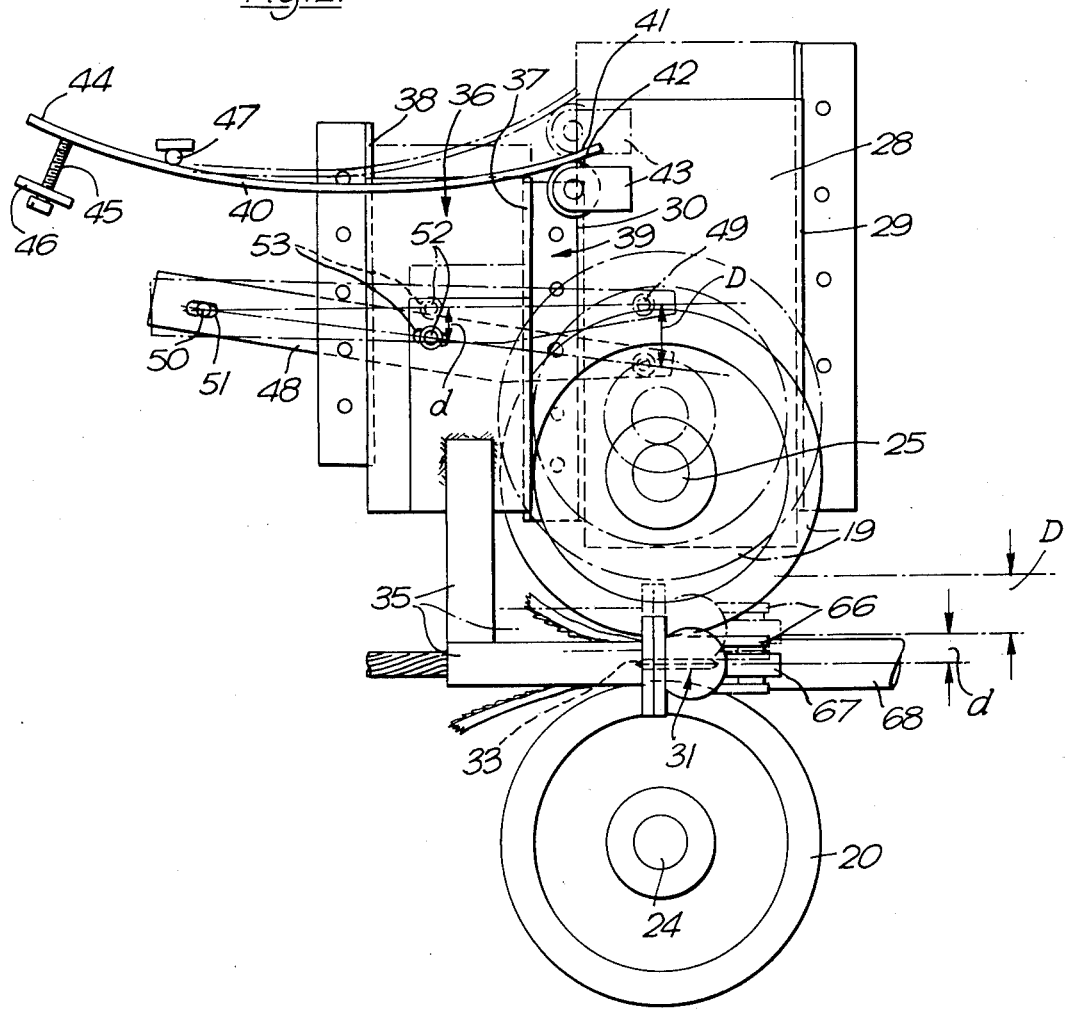
FIG. 2 is a schematic plan view of part of the machine illustrating an important part of its operation.
Figure 3:
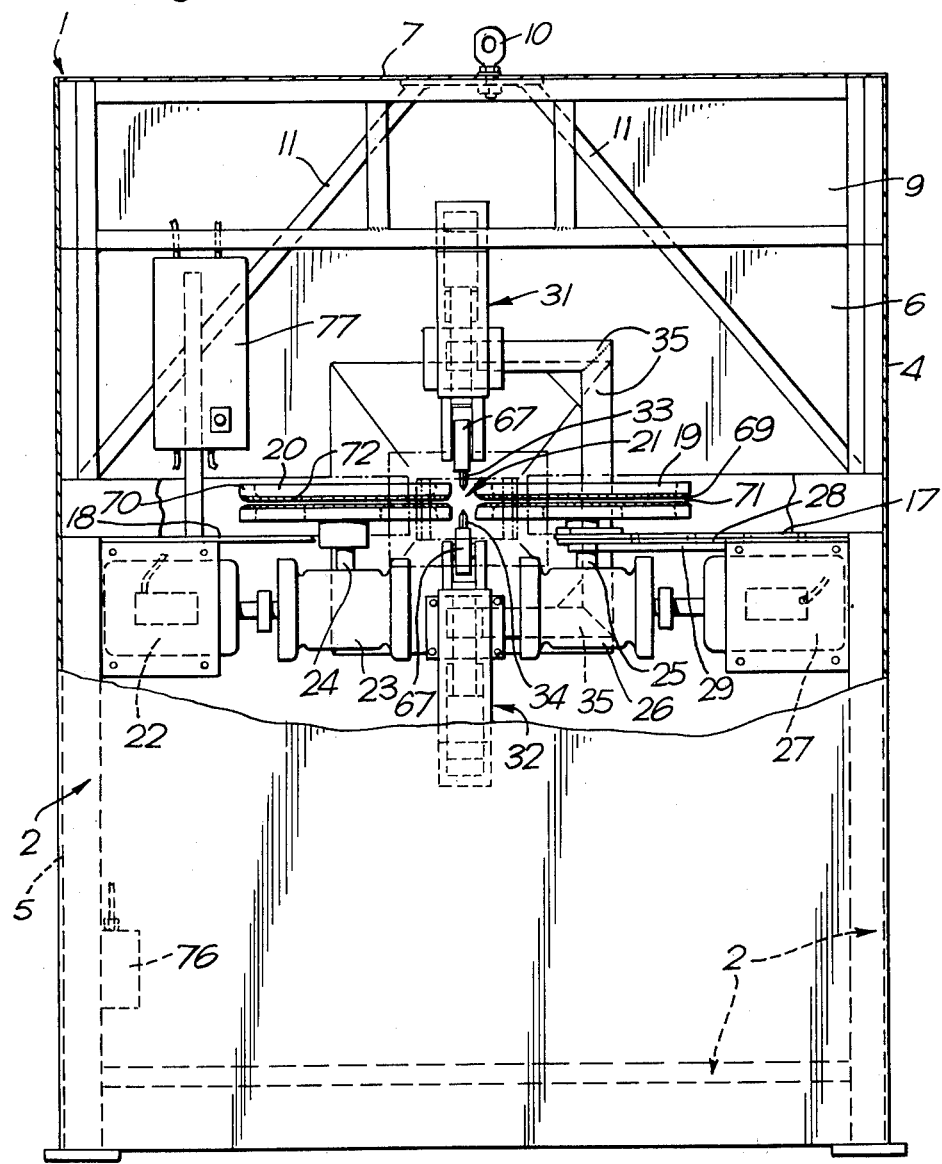
FIG. 3 is a front elevation of the machine with parts cut away.
Figure 4:
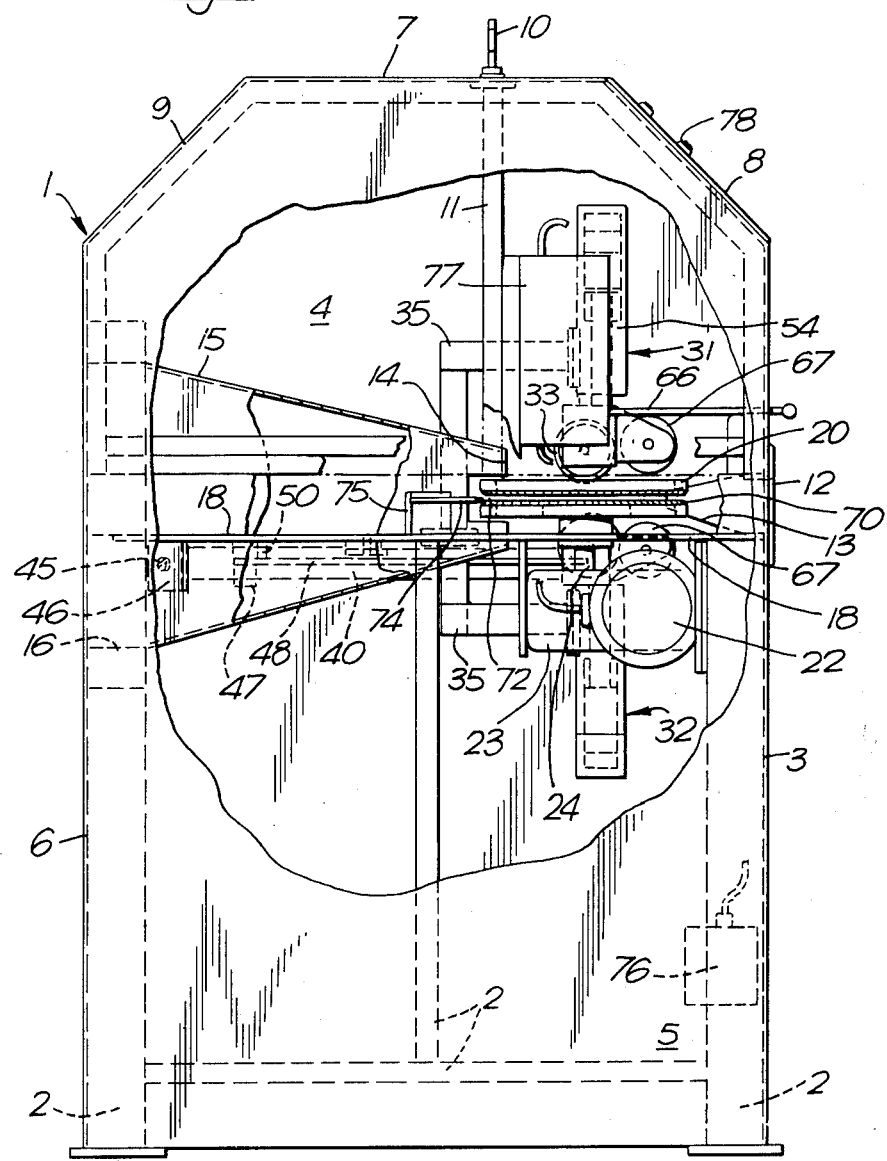
FIG. 4 is a side elevation of the machine with parts cut away.

Movement of the slide plate 28 together with the driving wheel 19 is transmitted to the second slide plate 36 by a tie-bar 48. One end of the tie-bar 48 is pivotally mounted on a pivot pin 49 fixed to the slide plate 28, and the other end of the tie-bar is pivotally mounted around a pivot pin 50 which is fixed to the underside of the support plate 17. There is no play between the tie-bar 48 and the pivot pin 49, whereas the pivot pin 50 extends through a longitudinal slot 51 in the tie-bar to allow longitudinal movement of the tie-bar relative to the pivot pin 50 as the slide plate 28 moves towards or away from the driving wheel 20 as shown in FIG. 2. The slide plate 36 is connected to the tie bar 48 by means of a pivot pin 52 which is fixed to the plate 36 exactly midway between the pivot pins 49 and 50, and which projects through a longitudinal slot 53 in the tie-bar. Because of the positioning of the pivot pins 49, 50 and 52, any movement of the slide plate 28, for example through a distance D shown in FIG. 2, will cause the tie-bar 48 simultaneously to move the slide plate 36 in the same direction but through half the distance, $d$, where $d = D/2$. Because the cutting wheel assemblies 31 and 32 are rigidly fixed to the slide plate 36 by the bracket 35, they will be moved through the same distance d, which is half the distance $D$ moved by the driving wheel 19. Consequently, whenever the driving wheel 19 moves towards or away from the other driving wheel 20, the cutting wheel assemblies 31 and 32 are moved automatically so that the plane containing the cutting wheels 33 and 34 is maintained substantially midway between the peripheries of the wheels 19 and 20 at the nip 21 between them. The limits of the movement of the driving wheel 19 towards and away from the other driving wheel 20 may be determined by the ends of the tie-bar slots 51 and 53 engaging their respective pivot pins 50 and 52, or alternatively by other stops (not shown) operative on the slide plate 28.

Figure 5:
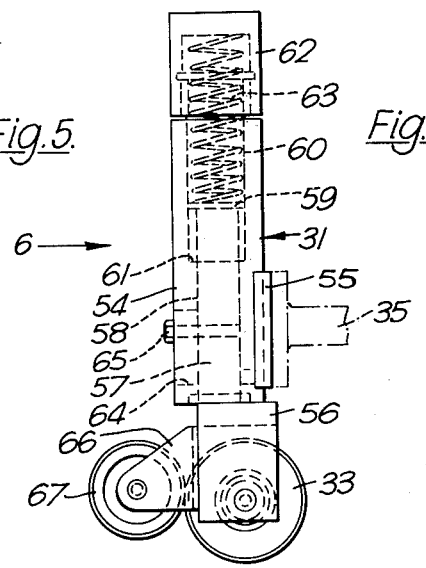
FIG. 5 is a side elevation of one of the cutting wheel assemblies of the machine; and, FIG. 6 is a front elevation of the cutting wheel assembly shown in FIG. 5, but with the cutting wheel in its most advanced position.
Figure 6:
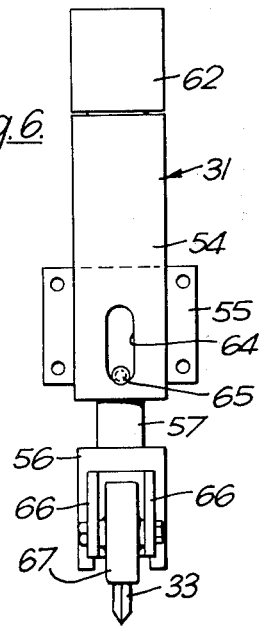

The cutting wheel assemblies 31 and 32 are identical to each other, and therefore only one of the assemblies 31 will be described in detail with reference to FIGS. 5 and 6. Each assembly comprises a cylinder 54 having fixed to it a mounting plate 55 for attaching the cylinder to the bracket 55 so that the axis of the cylinder 54 is vertical and aligned with the axis of the cylinder of the other cutting wheel assembly. The cutting wheel 33 is rotatably mounted between a fork 56 which is fixed at the lower end of a piston rod 57 which is axially slidable and rotatable in an axial bore 58 in the lower portion of the cylinder 54. The upper end of the piston rod 57 is attached to a piston 59 which peripherally engages the wall of a wider diameter axial bore 60 which is in the upper portion of the cylinder 54 and which leads into the bore 58 through an annular shoulder 61. At the upper end of the cylinder 54 the bore 60 is closed by a screw on end cap 62, and housed within the bore 60 is a compression spring 63 which acts between the end cap 62 and the piston 59 to bias the cutting wheel 33 away from the cylinder 54 towards the cutting wheel 34 of the other assembly 32. The biassing force acting on the cutting wheel 33 may be adjusted by adjusting the position of the cylinder end cap 62. The most advanced position of the cutting wheel 33 (i.e., its furthest position from the cylinder 54) is governed by the lower end of a longitudinally extending slot 64 in the wall of the cylinder 54, and a bolt 65 which projects through the slot 64 and is fixed to the piston rod 57.

The width of the slot 64 is greater than the diameter of the shank of the bolt 65, and consequently the piston rod 57 is allowed to rotate within the bore 58 between angular limits determined by the engagement of the shank of the bolt 65 with the longitudinal edges of the slot 64. Since the cutting wheel 33 is carried by the piston rod 57, this limited rotation of the piston rod 57 allows the cutting wheel freedom to swivel about the axis of the rod 57 within the same angular limits. The lower end of the slot 64 is concave, with a radius of curvature greater than that of the shank of the bolt 65 and its centre of curvature midway between the sides of the slot 64. This arrangement ensures that when the cutting wheel 33 is in its most advanced position, for example when the machine is not is use, the curved surfaces of the bolt shank and the lower end of the slot 64 will co-operate to center the cutting wheel, i.e., to align it with the other cutting wheel 34 in the common cutting plane perpendicular to the plane of the driving wheels 19 and 20 and midway between them.

The cutting wheel yoke 56 has a pair of extension flanges 66 projecting in a forward direction, i.e., on the side of the cylinder 54 opposite the mounting flange 55. Journalled between these extension flanges 66 is a nylon roller wheel 67 having its axis of rotation parallel to that of the cutting wheel 53.

In operation, a metal cored cable whose insulating sheath is to be stripped from the core is fed into the machine through the inlet opening 12 and the feed-in chute 13. The chute 13 directs the cable between the rollers 67 of the cutting wheel assemblies 31 and 32, and into the nip 21 between the driving wheels 19 and 20. This bias of the driving wheel 19 towards the driving wheel 20 causes the cable to be gripped between the driving wheels so that it is driven through the nip and between the opposing cutting wheels 33 and 34 which act to cut through the sheath of the cable. The cable with its split sheath then passes into the outlet chute 15 through its receiving end 14, and then from the machine through the outlet opening 16 at the rear. This passage of a cable 68 through the machine is illustrated partly in FIG. 2.

The periphery of each driving wheel 19, 20 is provided with a V-shaped profile 69, 70 respectively, which act together with the rollers 67 to keep the cable 68 centred as it is fed through the nip 21. Furthermore, the peripheries of the two driving wheels 19 and 20 are toothed within their V-shaped profiles in order to ensure that the cable is fed positively between them without any slip. At the base of its V-shaped profile 69, 70, each driving wheel 19, 20 has a circumferentially extending groove 71, 72 respectively. A scraper blade (not shown) which is attached to the free end of an arm 73 fixed to the slide plate 28 extends into the circumferential groove 71 of the driving wheel 19 in order to prevent the toothed periphery of the driving wheel 19 from becoming clogged. Similarly, a scraper blade 74 carried by a bracket 75 fixed to the side of the outlet chute 15 extends into the circumferential groove 72 of the driving wheel 20.

The machine is powered electrically and comprises an incoming power supply box 76 and a control box 77 conveniently mounted within the housing 1. A control panel 78 which is mounted on the sloping portion 8 of the housing 1 and which is electrically connected to the control box 77.

I claim:

1. In a machine for stripping automatically the sheath from metal cored cables, said machine comprising a pair of driving wheels, opposed peripheries of said driving wheels defining a nip through which, in use, a cable to be stripped is fed by said driving wheels, a pair of opposed cutting wheels, and a peripheral cutting edge on each of said cutting wheels projecting into the region of said nip substantially midway between said driving wheels whereby, as a cable is fed through said nip, the sheath of said cable is slit by said peripheral cutting edges of said cutting wheels continuously along the length of said cable on opposite sides of said cable to enable said sheath to separate from the core of said cable, the improvement wherein said machine includes means mounting one of said driving wheels for rotation about a fixed axis, means mounting the other of said driving wheels for movement linearly towards and away from said one driving wheel with said fixed axis, means biassing said linearly movable driving wheel towards said driving wheel with said fixed axis, and means linking said cutting wheels to said movable driving wheel whereby when said movable driving wheel is displaced towards or away from said driving wheel with said fixed axis, said cutting wheels are simultaneously displaced in the same direction but through half the distance moved by said movable driving wheel.

2. A machine as claimed in claim 1, wherein said linking means comprises an arm, means pivotally mounting said arm at one end, means pivotally connecting said arm to said movable driving wheel at the other end of said arm, means carrying said cutting wheels, and means pivotally connecting said carrying means to said arm midway between the pivot axes of said pivotal connections at said opposite ends of said arm, said arm being longitudinally displaceable about said pivot axis at one of said ends and the pivot axis of said pivotal connection of said carrying means to said arm.

3. A machine as claimed in claim 2, wherein said means pivotally mounting said arm at said end remote from said driving wheel comprises a frame of said machine, means defining a longitudinally extending slot in said arm, and a pivot pin fixed to said frame and extending through said slot whereby said arm is pivotable and longitudinally displaceable about said pivot pin.

4. A machine as claimed in claim 2, wherein said pivotal connection of said carrying means to said arm comprises means defining a longitudinal slot in said arm, and a pivot pin fixed to said carrying means and extending through said slot.

5. A machine as claimed in claim 2, wherein said means mounting said movable driving wheel includes a linearly guided slide plate carrying said driving wheel, and said pivotal connection of said arm to said movable driving wheel comprises means pivotally connecting said arm to said slide plate.

6. A machine as claimed in claim 5, wherein said means carrying said cutting wheels includes a further slide plate, and said machine includes means for linearly guiding said further slide plate parallel to said slide plate carrying said movable driving wheel, said arm being pivotally connected to said cutting wheel carrying means through said further slide plate.

7. A machine as claimed in claim 1, including a pair of electric motors for separately driving said driving wheels at the same nominal speed as each other.

8. A machine as claimed in claim 5, including a pair of electric motors for separately driving said driving wheels at the same nominal speed as each other, and wherein said electric motor for driving said movable driving wheel is carried by said slide plate.

9. A machine as claimed in claim 1, wherein said means biassing said movable driving wheel towards said driving wheel with said fixed axis comprises a spring steel strip which acts at one end on said movable driving wheel, an adjustable thrust member acting on the opposite end of said strip, and a fixed fulcrum over which said strip extends between said ends.

10. A machine as claimed in claim 1, wherein said periphery of each of said driving wheels has a V-shaped profile for keeping a cable centred as it is fed through said nip between the said driving wheels.

11. A machine as claimed in claim 10, wherein said periphery of each of said driving wheels has a toothed configuration in order to avoid slipping of said driving wheels on said cables.

12. A machine as claimed in claim 11, wherein each of said driving wheels has a central circumferentially extending groove in said periphery at the base of said V-shaped profile, and said machine includes scrapers mounted to project into said grooves of said driving wheels in order to keep said peripheral teeth of said driving wheels clear.

13. A machine as claimed in claim 1, including means biassing each of said cutting wheels towards the other and wherein said cutting wheels are retractable against said bias.

14. A machine as claimed in claim 13, wherein said biassing means is adjustable.

15. A machine as claimed in claim 1, including a pair of carrier members on which said cutting wheels are rotatably mounted, and means mounting each of said carrier members for rotation independently between fixed angular limits about an axis which lies in or parallel to the plane of said peripheral cutting edge of said corresponding cutting wheel and substantially perpendicular to the path of a cable through said nip between said driving wheels.

16. A machine as claimed in claim 15, wherein said means mounting said carrier members includes a pair of cylinders, and means supporting said cylinders on opposite sides of the plane of said driving wheels, said carrier members being rotatably mounted in said cylinders.

17. A machine as claimed in claim 16, wherein each of said carrier members is slideable axially within its cylinder, and said machine includes means acting in each of said cylinders on its carrier member to bias said cutting wheel carried by said carrier member towards the other of said cutting wheels.

18. A machine as claimed in claim 17, wherein said cutting wheel biassing means in each of said cylinders is a spring.

19. A machine as claimed in claim 17, wherein said cutting wheel biassing means in each of said cylinders comprises a fluid and means for controlling the pressure of said fluid.

20. A machine as claimed in claim 17, wherein each of said carrier members and its cylinder are provided with stop surfaces which are engageable to limit the movement of said corresponding cutting wheel towards the other of said cutting wheels.

21. A machine as claimed in claim 16, wherein said angular limits for the rotary movement of each of said carrier members are determined by means defining a slot in said carrier member or its cylinder, and a lug projecting radially from said cylinder or said carrier member respectively into said slot.

22. A machine as claimed in claim 20, wherein said angular limits for the rotary movement of each of said carrier members are determined by means defining a slot in said carrier member or its cylinder, and a lug projecting radially from said cylinder or said carrier member respectively into said slot, and wherein said lug and said slot also provide said stop surfaces.

23. A machine as claimed in claim 22, wherein the end of said slot nearest said cutting wheel has a surface which is concave with respect to said slot, whereby engagement of said lug with said concave surface under the action of said cutting wheel biassing means will tend to center said cutting wheel.

24. A machine as claimed in claim 15, wherein each of said carrier members also carries a roller arranged with its axis parallel to that of said cutting wheel whereby, in use, said roller runs on the surface of a cable in front of said cutting wheel.

25. A machine as claimed in claim 1, including means for separating from the core of a cable the two halves of the sheath slit by said cutting wheels.

26. A machine as claimed in claim 25, wherein said separating means comprises a pair of spreaders mounted behind said cutting wheels for engaging in the slits formed by said cutting wheels to force the cut edges of said sheath apart as said cable is continued to be fed.

* * * * *